(12) United States Patent
Behrenbrinker et al.

(10) Patent No.: US 7,092,905 B2
(45) Date of Patent: Aug. 15, 2006

(54) SYSTEMS AND METHODS FOR THE PROCESSING OF FINANCIAL TRANSACTIONS

(75) Inventors: Anita M. Behrenbrinker, Sioux Falls, SD (US); Richard D. Feight, Sioux Falls, SD (US)

(73) Assignee: Citibank, N.A., New York, NY (US)

(*) Notice: Subject to any disclaimer, the term of this patent is extended or adjusted under 35 U.S.C. 154(b) by 291 days.

(21) Appl. No.: 09/984,809

(22) Filed: Oct. 31, 2001

(65) Prior Publication Data

US 2002/0062279 A1 May 23, 2002

Related U.S. Application Data

(60) Provisional application No. 60/252,243, filed on Nov. 21, 2000.

(51) Int. Cl.
*G06Q 40/00* (2006.01)

(52) U.S. Cl. .............................. 705/39; 705/35; 705/38; 705/40

(58) Field of Classification Search .................. 705/35, 705/36, 37, 38, 39, 40
See application file for complete search history.

(56) References Cited

U.S. PATENT DOCUMENTS

| | | | | |
|---|---|---|---|---|
| 4,953,085 A | 8/1990 | Atkins | | 364/408 |
| 5,466,919 A | 11/1995 | Hovakimian | | 235/380 |
| 5,787,404 A | 7/1998 | Fernandez-Holmann | | 705/35 |
| 5,826,243 A | 10/1998 | Musmanno et al. | | 705/35 |
| 5,842,185 A | 11/1998 | Chancey et al. | | 705/40 |
| 5,852,811 A | 12/1998 | Atkins | | 705/36 |
| 5,864,828 A | 1/1999 | Atkins | | 705/36 |
| 5,872,928 A | 2/1999 | Lewis et al. | | 395/200 |
| 5,874,955 A * | 2/1999 | Rogowitz et al. | | 345/467 |
| 5,911,135 A | 6/1999 | Atkins | | 705/36 |
| 5,933,817 A | 8/1999 | Hucal | | 705/39 |
| 5,963,922 A * | 10/1999 | Helmering | | 705/35 |
| 5,970,480 A | 10/1999 | Kalina | | 705/37 |
| 5,991,736 A | 11/1999 | Ferguson et al. | | 705/14 |
| 6,014,635 A | 1/2000 | Harris et al. | | 705/14 |
| 6,018,718 A | 1/2000 | Walker et al. | | 705/14 |
| 6,021,943 A | 2/2000 | Chastain | | 235/379 |
| 6,049,782 A | 4/2000 | Gottesman et al. | | 705/35 |
| 6,128,602 A * | 10/2000 | Northington et al. | | 705/35 |
| 6,243,688 B1 * | 6/2001 | Kalina | | 705/14 |
| 6,374,230 B1 * | 4/2002 | Walker et al. | | 705/17 |
| 6,381,639 B1 * | 4/2002 | Thebaut et al. | | 709/221 |
| 6,678,696 B1 * | 1/2004 | Helland et al. | | 707/103 R |
| 2003/0014380 A1 * | 1/2003 | Myers et al. | | 707/1 |

OTHER PUBLICATIONS

International Search Report for Application No. PCT/US01/43126, dated Jan. 17, 2003 (mailing date).

(Continued)

*Primary Examiner*—Alain L. Bashore
(74) *Attorney, Agent, or Firm*—George T. Marcou; Kilpatrick Stockton LLP

(57) ABSTRACT

Systems and methods for processing credit card transactions including an account with a multi-dimensional balance structure, wherein balance segments within the balance structure have individually-definable terms and conditions. A system receives incoming transaction data by way of a conventional transaction system. A transaction processor within the system uses predetermined balance rules to determine an appropriate balance segment within an associated masterfile, which stores data. The multi-dimensional balance structure allows financial institutions to provide customers with special promotions for transactions meeting predetermined requirements, such as transactions with particular merchants, Internet purchases, and automobile-related purchases.

23 Claims, 3 Drawing Sheets

OTHER PUBLICATIONS

Written Opinion for Application No. PCT/US01/43126, dated Jun. 13, 2003 (mailing date).

Preliminary Examination Report for Application No. PCT/US01/43126, dated Nov. 6, 2003 (mailing date).

* cited by examiner

SYSTEMS AND METHODS FOR THE PROCESSING OF FINANCIAL TRANSACTIONS

CROSS-REFERENCE TO RELATED APPLICATIONS

This non-provisional patent application claims the benefit of U.S. Provisional Patent Application No. 60/252,243, filed Nov. 21, 2000, and incorporates the provisional application by reference in its entirety.

FIELD OF THE INVENTION

The present invention relates generally to systems and methods for the processing of financial transactions, and more particularly, to systems and methods for the processing of credit card transactions.

BACKGROUND OF THE INVENTION

Conventional credit card transaction processing systems comprise a network of merchants connected via a plurality of telecommunications links to financial institutions. VISA®, MASTERCARD®, and DISCOVER® are typical credit card networks that allow local and national banks to issue credit cards under a single authorization system in a standardized fashion. A typical transaction system 10 is schematically depicted in FIG. 1. At a point of sale terminal 12, a merchant or customer inserts a customer's credit card 14 and enters the amount of a purchase, which is the financial transaction. Transaction information 16 is sent via a plurality of telecommunications links and computer networks through a credit card network 18 to the credit card issuer's processor 20. The credit card issuer's processor 20 is associated with a credit card issuing bank 22, which maintains the customer's account. The card issuer's processor 20 analyzes the transaction information 16 and sends an authorization signal 24, approving, rejecting, or referring the transaction, back through the credit card network 18 to the merchant. The entire process must be performed in a matter of seconds to provide a real time authorization process for customers and merchants.

Today, the use of credit cards has become the predominate method of payment for goods and services. Credit cards offer customers a wide array of advantages over traditional methods of payment, such as allowing customers to avoid the risks associated with carrying large quantities of cash, and allowing customers to make large purchases and pay for them over a period of time. Real-time authorization and standardization of credit card networks, such as VISA® and MASTERCARD®, have led to widespread acceptance by the majority of merchants.

Merchants are competing more vigorously than ever before to cultivate new customers and predict current customers' needs. Due to the myriad of advertisements that a customer may face daily, merchants have become more selective in their advertising and promotional efforts. Merchants often target customers using specific marketing promotions based on a customer's past purchasing profile. In addition, credit card issuers have developed business relationships with merchants that provide customers with incentives, such as airline frequent flyer miles. Frequent flyer miles are reward points that a customer accumulates by making purchases with specific merchants. Accumulated points may then be used towards the purchase of plane tickets, hotel accommodations, automobile rentals, and upgrades. This relationship provides the customer with an incentive to use both a given bank's credit card and the goods or services of the participating merchant.

Conventional credit card systems have a limited ability to segregate balances within a single customer account, such as separating cash advances from merchant transactions. These conventional systems are not flexible enough to accommodate separating merchant transactions further into additional balances depending on the specific transaction. As a result, incentives that a card issuer, merchant, or other interested party may apply to a given transaction are limited.

BRIEF SUMMARY OF THE INVENTION

In response to the limitations of the conventional systems discussed above, and as the demand for promotional incentives increases, the present invention includes systems and methods that provide for the creation of a customer account having a plurality of separate balances, each with different terms and conditions, organized based on the type of transaction that is involved.

In order to promote new goods and services, credit card issuers have a need to keep select credit card transactions in separate balances within a single customer account. For example, credit card issuers may offer special promotions, such as reduced interest rates, increased credit lines, reduced fees, and other special offers for credit card transactions made with a particular merchant, or, for transactions of a particular type, such as Internet purchases, automobile-related purchases, etc. Further, the present invention allows credit card issuers to monitor and view customer expenditure trends, and provide special promotions with multiple merchants or other interested parties.

The systems and methods of the present invention include a transaction level processor, the processor operable for analyzing an incoming credit card transaction and allocating the transaction into one of a plurality of balance segments. Balance segments are predefined by a card issuer within a masterfile associated with a customer account. The transaction level processor analyzes the plurality of transaction data associated with an incoming transaction according to a plurality of predefined balance rules, and determines where to direct each incoming transaction. Once an incoming transaction is directed into an appropriate balance segment, one of a plurality of terms and conditions associated with the balance segment allows balance variables, such as pricing, fee structure, payment, terms, etc., to be individually set for each balance segment. The masterfile includes a multi-dimensional balance structure, including each of the plurality of balance segments, and a total account balance, where the total account balance sums the balance segments. Thus, the credit card systems and methods enable the application of differing terms and conditions to credit card transactions based on the type of transaction determined from the transaction data. Further, the systems and methods enable all transactions for a particular customer account to be sorted and totaled, using predefined balance segments for presentation to the customer, or, for analysis by the card issuer.

The foregoing and other features of the invention will become more apparent from the following detailed description of a preferred embodiment which proceeds with reference to the following drawings.

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims and as a representative basis for teaching one skilled in the art to variously employ the present invention.

The present invention provides systems and methods used to separate a customer's account into a plurality of predefined balance segments, with each balance segment having associated terms and conditions based on transaction data. By providing predefined balance segments and associated terms and conditions, a card issuer, merchant, or other interested party is provided with the ability to offer incentives to customers for performing certain transactions. An incentive may be in the form of reduced interest rates, an increased line of credit, a reduced fee, or some other similarly attractive feature that may encourage a customer to perform a transaction that qualifies for a given incentive.

In one embodiment of the present invention, a transaction level processor receives incoming transaction data and identifies the customer account associated with the transaction. Using the transaction data, the transaction processor accesses a table of predetermined balance rules associated with the customer account and balance segment. Using the balance rules, the transaction level processor compares the transaction data to each balance rule, and stores each transaction in the appropriate balance segment in a masterfile. Additionally, the transaction level processor may generate a report or bill detailing the complete masterfile, or portions thereof, for review by the card issuer and customer. By establishing a single customer account having a plurality of balance segments, where each transaction may be allocated to at least one balance segment having predetermined terms and conditions based on determining a match between the balance rules and the transaction data, incentives may be provided.

Figure 1:
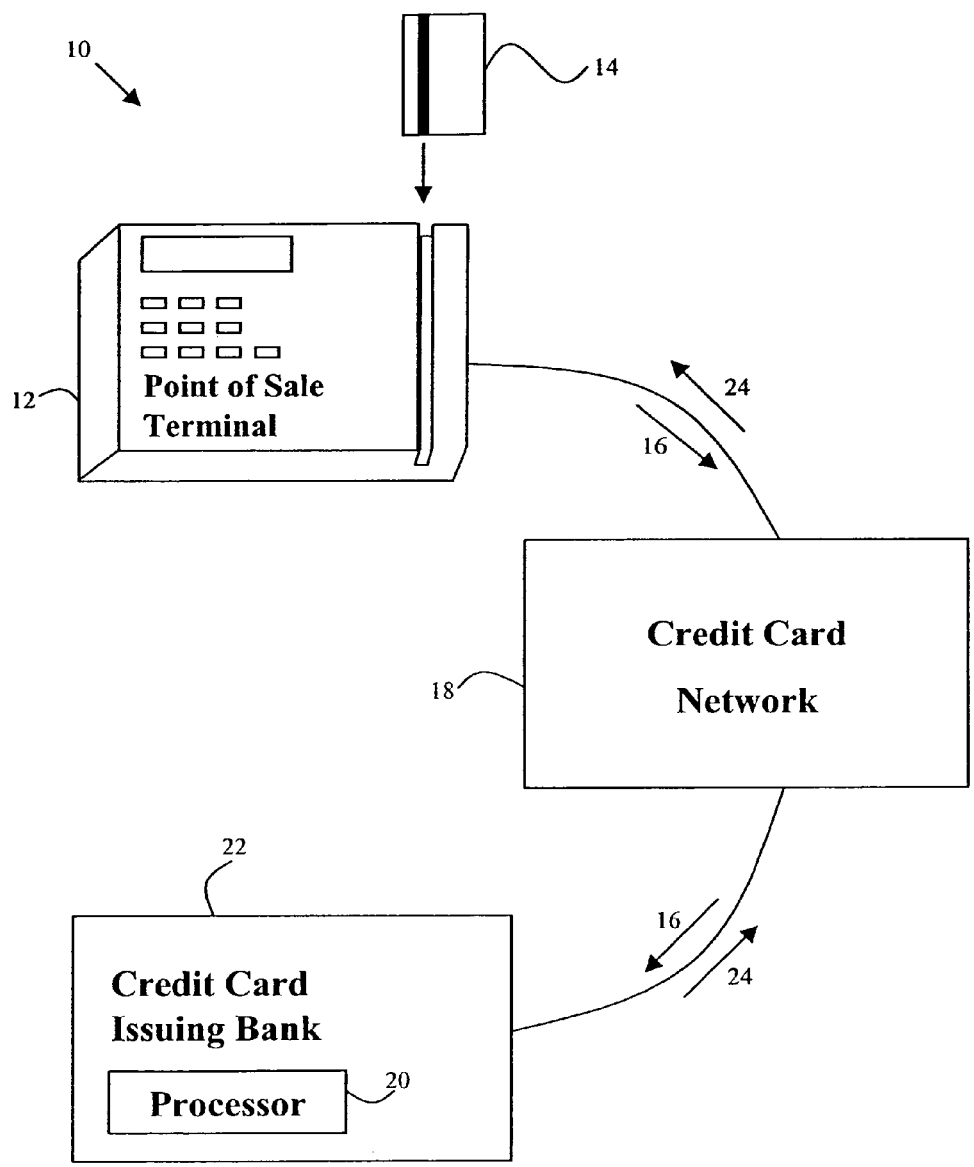
FIG. 1 is a schematic diagram illustrating a conventional credit card authorization system.
Figure 2:
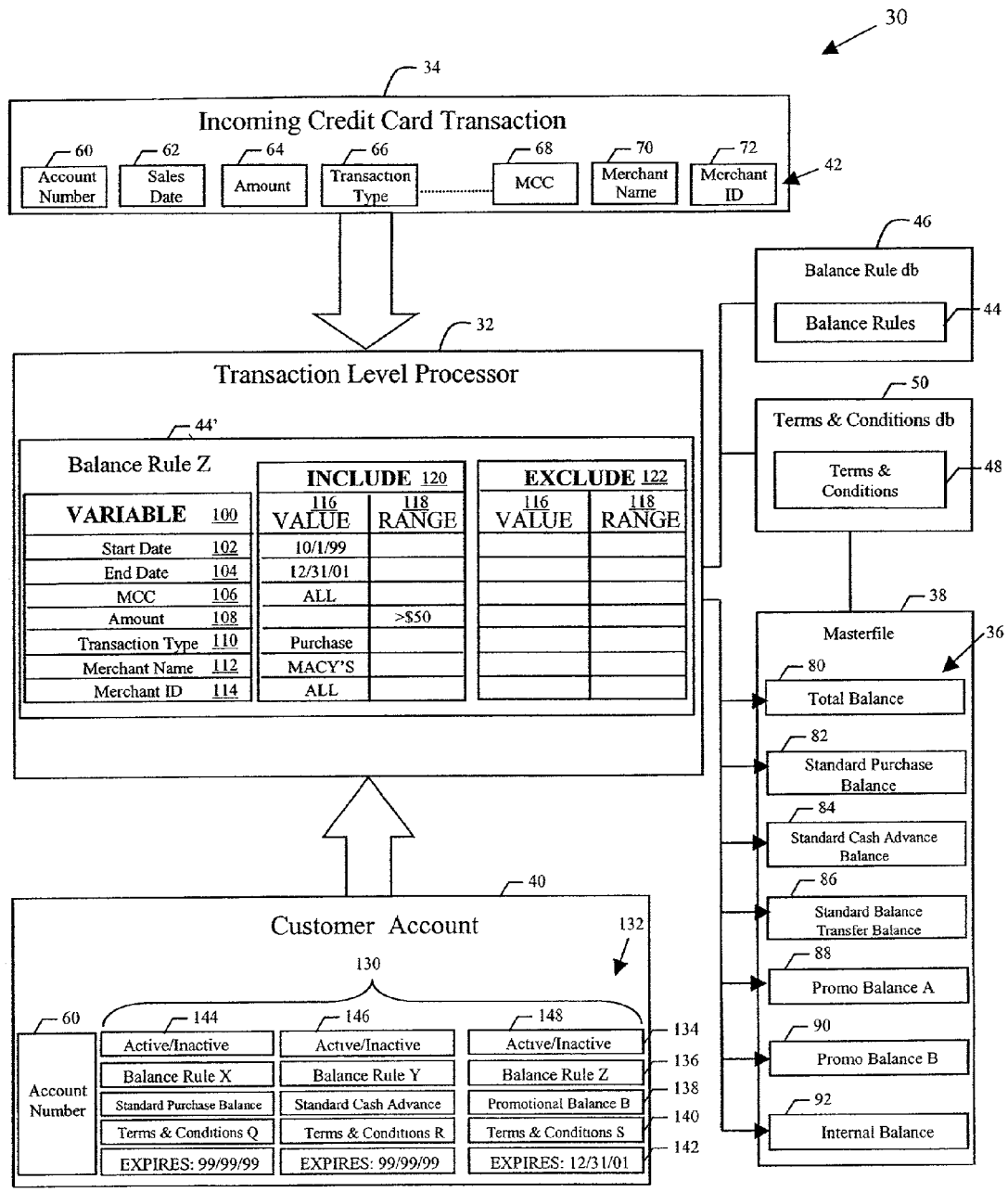
FIG. 2 is a schematic block diagram illustrating data processing using a transaction level processor of one embodiment of the present invention.

Referring to FIG. 2, one embodiment of a financial processing system 30 includes a transaction level processor 32, operable for analyzing an incoming credit card transaction 34 and allocating the transaction into one of a plurality of balance segments 36 within a masterfile 38 associated with a customer account 40. Each incoming transaction 34 includes transaction data 42 which identifies the customer account and details of the particular transaction. The transaction level processor 32 analyzes the transaction data 42 using balance rules 44 retrieved from a balance rules database 46 associated with the customer's account 40. The transaction level processor 32 then allocates all or a portion of the incoming transaction 34 to a particular balance segment 36 associated with the applicable balance rule 44. Terms and conditions 48 associated with the particular balance segment 36 are retrieved from a terms and conditions database 50 and applied to the balance of each balance segment. Thus, the present invention provides a credit card transaction processing system and method having an account with a multi-dimensional balance structure, where an incoming transaction is sorted into a particular balance segment based on predefined balance rules, and where each balance segment within the balance structure has individually-definable terms and conditions.

The transaction level processor 32 includes software, hardware, firmware, and processing capabilities for performing data analysis, retrieval, and output. For example, a suitable example of a transaction level processor is on-line, real-time application software operating with IBM's CICS transaction server or WebSphere application server software, using a series of processing rules contained within a database.

The incoming transaction 34 is an authorized transaction performed utilizing a financial account, such as a credit, debit, securities, or like account. For example, the transaction may be performed utilizing a card from a card issuer, or utilizing an electronic certificate or other electronic representation of an account. The incoming transaction 34 includes transaction data 42, which is information sent with all standard transactions across the related networks. The details of the formatting of the incoming transaction and of the data included in a standard incoming transaction may be found in the ISO standard ISO8583 (which is readily available from the International Standards Organization, VISA®, and MASTERCARD®associations) or other applicable transaction formats. Typical transaction data 42 may include, but is not limited to, account number 60, sales date 62, transaction amount 64, transaction type 66, Merchant Category Code (MCC) 68, merchant name 70, and merchant identification number 72 associated with the transaction.

The masterfile 38 is unique for each customer account 40, and includes a plurality of balance segments 36. Balance segments 36 may include total account balance segments 80, standard purchase balance segments 82, standard cash advance balance segments 84, standard balance transfer balance segments 86, and one or more promotional or special balance segments, such as Promo Balance A balance segment 88, Promo Balance B balance segment 90, or an internal balance segment 92.

The total account balance segment 80 stores a total of all debits and credits currently outstanding on the associated customer account 40. The balance of the total account balance segment 80 may be determined in any manner, such as by the sum of all balance segments 36. This may not be the case, however, if special balance segments 36 are set up by the card issuer, as is discussed below, or if a particular transaction qualifies for more than one balance segment. Alternatively, the total account balance segment 80 may be the sum of a portion of all of the other balance segments 36. For example, the total account balance segment 80 may be the sum of the standard balance segments including the purchase balance segment 82, cash advance balance segment 84, and balance transfer balance segment 86. The balances from promotional balance segments 88, 90 are accounted for in the corresponding standard balance segments based on the transaction type. In yet another embodiment, the total account balance segment 80 may be determined by allocating each incoming transaction 34 to the total account balance segment, as well as any other balance segment to which the incoming transaction may apply based on the balance rules. Therefore, the total account balance segment 80 does not necessarily have associated balance rules 44, and may simply be determined by performing a batch run summarizing all or a portion of other balance segments 36.

The standard purchase 82, cash advance 84, and balance transfer 86 segments store a total outstanding balance of all or a portion of the standard purchase, cash advance, and standard balance transfer transactions associated with the customer account 40. The standard purchase, cash advance, and standard balance transfer transaction are incoming transactions 34 identified by a predetermined value of the transaction type 66. Whether or not the standard balance segments 82, 84, and 86 include all or a portion of their respective types of transactions depends on the accounting rules being utilized with the system 30. For example, if the system 30 utilizes an accounting rule specifying that each incoming transaction be allocated to only one balance segment, and hence have only one set of terms and conditions applied thereto, then an incoming transaction having a standard purchase transaction type, and including other transaction data that qualify it for a promotional balance segment, may be allocated to the promotional balance segment, where the total balance of the standard purchase balance segment does not include this transaction. On the other hand, the system may utilize an alternative accounting rule in which the incoming transaction from the previous example may be included in the balance calculations of both the standard purchase and promotional balance segments. This last example typically is more complicated and only one set of terms and conditions may be applied to a particular transaction. In this case, the portion of the balance of the standard purchase balance segment that comes from some other balance segment may be segregated out of the standard purchase balance when the terms and conditions are applied to the balance to determine a required customer payment.

Promotional, or special balance segments 88 and 90, each store a total outstanding balance of incoming transactions 34 associated with a customer's account 40. They are allocated to the particular balance segment based on the associated balance rules 44. The promotional, or special balance segments 88 and 90, are predefined by the card issuer and may be associated with the customer's account 40 by the customer at the time of opening the account, or, at any later time. The promotional balance segments 88 and 90 are associated with given balance rules 44 and terms and conditions 48, thereby allowing the controller of the customer account, typically the card issuer or any other party associated with the card issuer, to offer the customer incentives for performing particular transactions.

The internal balance segment 92 is established for use by the card issuer, and may have restricted access. The internal balance segment 92 aids the card issuer in managing customer credit. For example, a card issuer may establish an internal balance segment for risk determination or marketing purposes. The card issuer may establish an internal balance segment that has associated balance rules in order to monitor the transaction behavior of a customer. These balance rules may sort out transactions that qualify as "high quality purchases", as defined by the card issuer in the variables of the balance rule, so that the card issuer may offer a customer making this type of transaction a better rate. Additionally, card issuer-defined internal balance segments enable a card issuer to solicit a customer for certain offers, such as performing transactions with specific merchants. As with other balance segments 36, any values associated with the transaction data 42 may be utilized in a balance rule 44 by the card issuer to allocate a transaction to an internal balance segment 92. The allocation processing of an incoming transaction into the internal balance segment works in the same manner as described below for all other balance segments 36. Each balance segment 36 works in conjunction with the balance rules 44 and terms and conditions 48, in order to provide a total outstanding balance, as is discussed in more detail below.

The balance rule database 46 includes one or a plurality of balance rules 44 that may be applied to each incoming transaction 34. Each of the balance rules 44 include one or a plurality of variables 100 corresponding to the transaction data 42, which govern the allocation of the incoming transaction 34 to a balance segment 36. Referring to FIG. 2, where Balance Rule Z is shown retrieved within transaction level processor 32, typical variables 100 include, but are not limited to, start date 102, end date 104, MCC 106, transaction amount 108, transaction type 110, merchant name 112, and merchant identification number 114. The variables 100 may be values 116 or ranges 118, and are used to either include 120 or exclude 122 the incoming transaction 34 from being associated with a given balance rule 44. The particular variables 100, values 116, and ranges 118 associated with each balance rule 44, are preferably defined by the card issuer, or by the card issuer in conjunction with a merchant or other promotion sponsor. Additionally, the balance rules database 46 may store the balance rules 44 in a given hierarchy, such that the balance rules are compared to the incoming transaction 34 in a predetermined order. As such, each balance rule 44 may include a definition of, or value corresponding to its hierarchical order, or alternatively, each balance rule may be relatively positioned in the table of rules based on the predetermined order. For example, a balance rule associated with a promotional balance segment may be applied to an incoming transaction before a balance rule associated with a standard purchase balance segment, so that the incoming transaction may be first allocated to the promotional balance segment, if appropriate.

The terms and conditions database 48 includes one or a plurality of terms and conditions 48 associated with, and applied to, each balance segment 36. Each of the terms and conditions 48 include a set of balance variables, such as pricing, fee structure, minimum payment, discounts, etc. By providing a plurality of terms and conditions 48, and by associating a particular set of terms and conditions 48 to a particular balance segment 36, the present invention provides for unique treatment for each balance segment. The particular balance associated with each of the terms and conditions 48 are preferably defined by the card issuer, or by the card issuer in conjunction with a merchant or promotion sponsor, thereby allowing the card issuer, merchant, or other sponsor to provide an incentive to the customer to perform a predefined transaction.

The customer account 40 is a file which includes a reference account number 60 and one or a plurality of balance segment files 130. Balance segment files 130 correspond to the balance segments 36 predefined by the card issuer or controller of the account, and selected by the customer. The balance segment files 130 include fields 132 that identify the features of the corresponding balance segment 36. For example, the fields 132 include, but are not limited to, status field 134, balance rule name field 136, balance segment name field 138, terms and conditions name field 140, and expiration date field 142. The status field 134 indicates whether the particular balance segment file 130 is active or inactive to incoming transactions 34. For example, the system may automatically insert any balance segment file for which the customer qualifies into the customer account, and then only customer-selected balance segment files have an active status. The balance rule name field 136 identifies the balance rule 44 corresponding to the balance segment file 130. The balance segment name field 138 identifies the name of the balance segment 36 corresponding to the balance segment file 130. The terms and conditions name field 140 identifies the terms and conditions 48 associated with the particular balance segment 36. Each of the selected balance segment files 130 may include either a predetermined set, or alternatively selectable combinations, of balance rule name field 136, balance segment name field 138, terms and conditions name field 140, and expiration date field 142. In other words, every customer selecting Promotional Balance B may be given the same parameters associated with that balance, or the Promotional Balance B may be customized for each individual customer. For example, a promotional balance segment may have a number of associated terms, conditions, and balance rules that vary depending on credit and transaction history of the customer.

In processing an incoming transaction 34, if the balance segment file 130 has a status field 134 indicating an active state, then the transaction level processor 32 retrieves the associated balance rule 44 and applies the values 116 or ranges 118 of the variables 100 to the transaction data 42 of every incoming transaction associated with the customer's account 40, to either include or exclude the transaction from being allocated to the given balance segment. If the balance segment file 130 has a status field 134 indicating an inactive state, the processor 32 will bypass retrieving and applying the associated balance rule 44, thereby saving valuable processing time.

Figure 3:
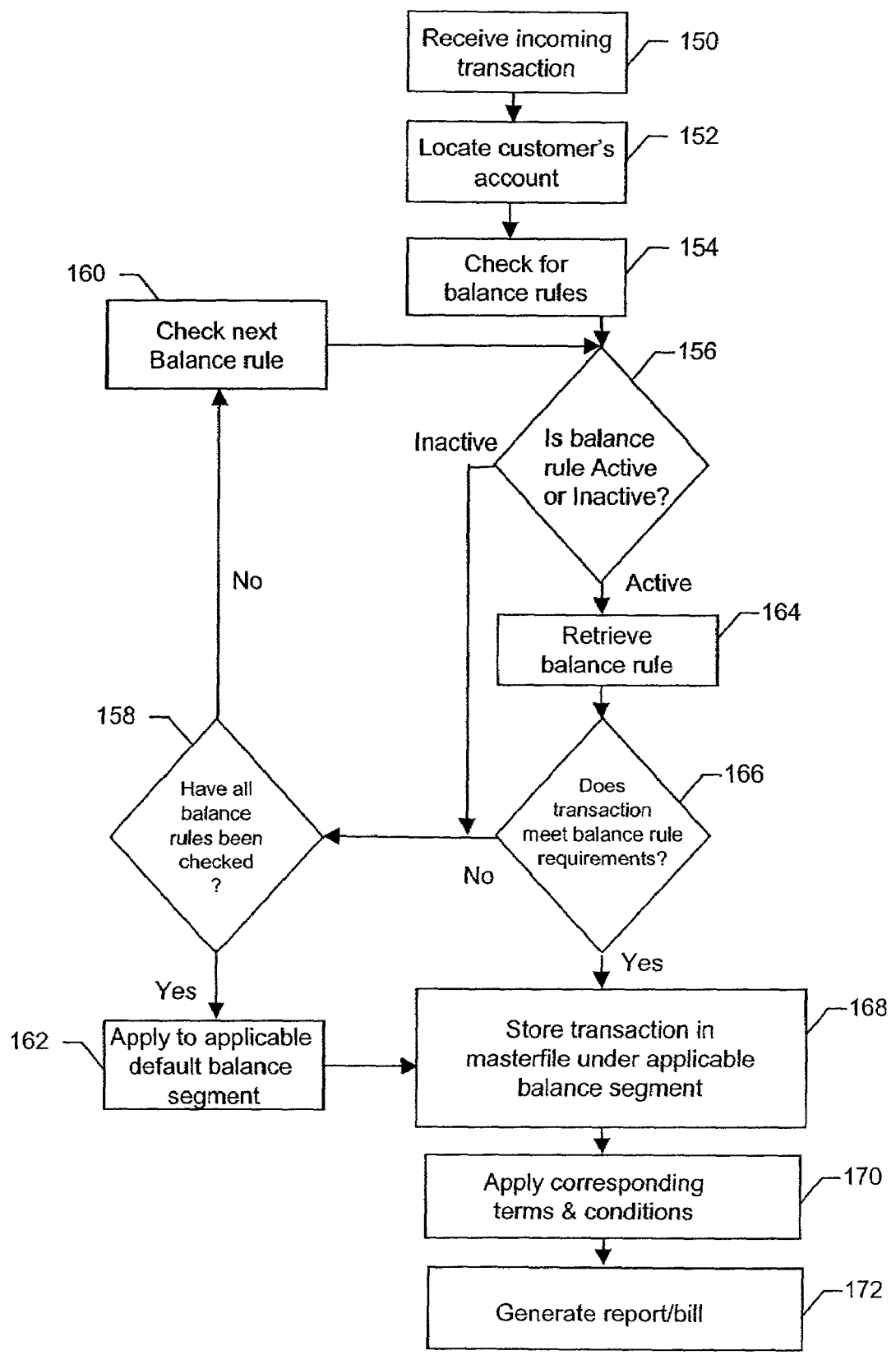
FIG. 3 is a flow chart illustrating one embodiment of the transaction level processor of the present invention, sorting incoming credit card transactions into one of a plurality of balance segments.

Referring to FIG. 3, one embodiment of the method of transaction processing involves the transaction level processor sorting incoming credit card transactions into one of a plurality of balance segments. In this embodiment, this may occur after the card issuer has defined particular balance segments with corresponding balance rules, terms, and conditions. Also, the customer may need to select some or all balance segments to be associated with their account number. In operation, the transaction level processor 32 receives the incoming credit card transaction data 42 from a credit card network by way of telecommunication lines or a computer network (Block 150). The processor 32 then locates the customer account 40 using the account number 60 identified in the transaction data 42 (Block 152). The processor 32 then proceeds to check the customer account 40 for active balance rules 44 (Block 154). To check for active balance rules 44, the processor 32 inspects the status field 134 of each balance segment file 130 to determine if the associated balance rule 44 is active or inactive (Block 156). If the status field 134 indicates an inactive status, the processor 32 determines if all the balance segment files 130 have been checked (Block 158). If not all balance segment files 130 have been checked, the processor 32 proceeds to the next balance segment file 130 to see if the balance rule is in effect (Block 160). If the processor 32 locates a balance segment file 130 having a status field 134 indicating that a balance rule 44 is active (Block 156), the processor retrieves the applicable balance rule 44 from the balance rule database 46 (Block 164). The processor 32 then determines whether or not the transaction data 42 complies with the limitations of the balance rule 44 (Block 166). If the transaction data 42 complies, the processor 32 stores the incoming transaction 34 and the associated transaction data 42 in the masterfile 38, under the balance segment 36 corresponding to that balance segment file 130 and balance rule 44 (Block 168). If the transaction data 42 does not meet the balance rule requirements, the processor 32 again determines if all balance segment files 130 have been checked (Block 158). If all balance segment files 130 have been checked (Block 158), and no active balance segment has been found, the processor performs a default allocation of the transaction, for example, by transaction type 66, to either the standard purchase 82, cash advance 84, or balance transfer balance segment 86 (Block 162). Typically, this type of default allocation would not occur, however, as each of the default balance segments 82, 84, and 86 are normally associated with a balance segment file 130 and have an active status field 134 in the customer account 40.

Once the processor 32 allocates the incoming transaction 34 to the appropriate balance segment 36, the terms and conditions 48 associated with the balance segment 36 are applied to the balance of that segment (Block 170). The application of the terms and conditions (Block 170) include processing the accruing of credits, debits, and interest associated with each balance segment. The customer payments, accounted for as a credit toward the account, may designate portions of the payment to be allocated to any of the balance segments, or the payment may be automatically designated to one or more balance segments in a predetermined order, amount and/or percentage.

Finally, the system 30 may generate a report/bill that details all or a portion of the masterfile 38, including balance segment balances and transaction histories, for review by the customer or card issuer (Block 172). The report/bill generation (Block 172) includes, for example, printed, graphical, and electronic representations of the information in the masterfile 38. It should be noted that the various actions of the above-described transaction processing method may be substantially performed over a short time duration or in real-time, or each of the various actions may be performed at a different times, such as in batch processes. Further, the actions may be performed in any number of varying orders to accomplish the same final result.

For example, referring to customer account 40 in FIG. 2, balance segment files 144, 146 and 148 are associated with account number 60. Balance segment file 144 corresponds to a Balance Rule X associated with the standard purchase balance segment 82 and Terms and Conditions Q. Similarly, balance segment file 146 corresponds to a Balance Rule Y that is associated with the standard cash advance balance segment 84 and Terms and Conditions R, and balance segment file 148 corresponds to a Balance Rule Z that is associated with the Promo Balance B balance segment 90 and Terms and Conditions S. Balance Rules X, Y and Z, and Terms and Conditions Q, R and S are each one of the plurality of balance rules 44 and terms and conditions 48, respectively, as described above.

Continuing with the above example, if the transaction processor 32 determines that balance segment file 148 is active, it retrieves Balance Rule Z 44' (shown inside transaction level processor 32) from the plurality of balance rules 44 stored in balance rule database 46. According to balance segment file 148, Balance Rule Z 44' is associated with Promo Balance B balance segment 90 and includes a number of variables 100 that are compared to the transaction data 42 of an incoming transaction 34, to determine if the incoming transaction should be allocated to the Promo B balance segment 90. The variables 100 require: the purchase be made between Oct. 1, 1999 and Dec. 31, 2001; all MCC are considered; a transaction amount greater than $50.00; the transaction type needs to be a purchase; the transaction needs to be performed at the merchant MACY'S®; and all merchant identifications are accepted. If the transaction conforms to the limitations, the processor 32 updates the masterfile 38 associated with the account number 60 by updating the balance of the Promo B balance segment 90. The processor 32 may then identify other active balance segment files 130 and perform a similar analysis to determine if the incoming transaction 34 may be allocated to other balance segments 36. For example, a single transaction 34 may be allocated to the total account balance segment 80, as well as a special promotion balance segment 90. If there is no active balance segment located, transactions are defaulted to the standard purchase, cash advance, or balance transfer segments, and added to the total account balance.

The present invention provides embodiments of systems and methods for a credit card banking system having an account with a multidimensional balance structure, wherein each balance segment within the balance structure has individually-definable terms and conditions. The system receives incoming transaction data by way of a conventional credit card system. The system then uses predetermined balance rules to decide the appropriate balance segment within the customer's masterfile to store the transaction data. The multi-dimensional balance structure allows financial institutions to provide customers with special promotions, such as reduced interest rates, increased credit lines, reduced minimum payments, and reduced fees for credit card transactions at a particular merchant or for transactions of a particular nature, such as Internet purchases, automobile-related purchases, etc.

While the invention has been disclosed in a preferred embodiment, it will be apparent to those skilled in the art that many modifications, additions, and deletions can be made therein without departing from the scope and spirit of the invention as claimed.

What is claimed is:

1. A method for processing a financial transaction to determine which terms and conditions to apply to the financial transaction, comprising:
   defining a plurality of balance segments, wherein the plurality of balance segments have a plurality of associated balance rules and terms and conditions, wherein the balance rules govern the allocation of the financial transaction to a particular balance segment;
   selecting one or more of the balance segments to be associated with an account number;
   receiving incoming transaction data from a transaction network, and analyzing the data with a transaction level processor;
   locating a customer account through association with the account number identified in the transaction data, wherein a balance of the customer account is further separated into the plurality of balance segments;
   inspecting a status field of each balance segment to determine if the associated balance rule is active or inactive;
   determining if all balance segments have been checked;
   receiving the applicable balance rule from a balance rule database;
   analyzing whether the transaction data complies with limitations of the balance rule;
   storing the transaction data in a masterfile under the applicable balance segment and balance rule; and
   applying the terms and conditions associated with the balance segment.

2. The method of claim 1, further comprising:
   generating a report/bill that details all or a portion of the masterfile.

3. The method of claim 1, wherein the terms and conditions comprise a set of balance variables selected from the group consisting of pricing, fee structure, minimum payment, and discount balance variables.

4. The method of claim 1, wherein the balance segments comprise balance segments selected from the group consisting of total account, purchase, balance transfer, and promotional balance segments.

5. The method of claim 1, wherein the balance segments comprise fields selected from the group consisting of status, balance rule name, balance segment name, terms and conditions name, and expiration date fields.

6. The method of claim 1, wherein the balance rules comprise variables selected from the group consisting of start date, end date, Merchant Category Code (MCC), transaction amount, transaction type, merchant name, and merchant identification number variables.

7. The method of claim 1, wherein the transaction data comprises credit card transaction data.

8. The method of claim 1, wherein the transaction network comprises a credit card transaction network.

9. A system for processing a financial transaction, comprising:
   a transaction level processor operable for analyzing an incoming transaction and allocating the transaction into one of a plurality of balance segments disposed within a masterfile associated with a customer account, the transaction level processor comprising:
   means for identifying the customer account using an account number;
   means for retrieving a plurality of balance rules from a balance rule database;
   means for analyzing transaction data using the balance rules associated with the customer account; and
   means for allocating all or a portion of the transaction to a particular balance segment associated with the applicable balance rule; and
   means for retrieving terms and conditions associated with a particular balance segment from a terms and conditions database;
   wherein a balance of the customer account is separated into the plurality of balance segments.

10. The system of claim 9, further comprising:
    means for generating a report/bill detailing all or a portion of the masterfile.

11. The system of claim 9, wherein the balance rules comprise variables selected from the group consisting of start date, end date, Merchant Category Code (MCC), transaction amount, transaction type, merchant name, and merchant identification number variables.

12. The system of claim 9, wherein the transaction comprises a credit card transaction.

13. A method for providing a customer account wherein a balance comprises a plurality of balance segments with different terms and conditions, the balance segments organized based on a type of financial transaction, the method comprising:
    providing a transaction level processor operable for receiving incoming transaction data;
    identifying a customer account associated with the transaction;
    accessing a plurality of predetermined balance rules associated with the customer account, wherein each balance rule is associated with a particular balance segment;

comparing the transaction data with each balance rule;

storing the transaction data in the appropriate balance segment in a masterfile upon satisfying the balance rule; and providing incentives associated with the balance segment to a customer for making the transaction.

14. The method of claim 13, further comprising:

generating a report/bill detailing all or a portion of the masterfile.

15. The method of claim 13, wherein the incentives comprise incentives selected from the group consisting of reduced interest rate, increased credit line, and reduced fee incentives.

16. The method of claim 13, wherein the balance segments comprise balance segments selected from the group consisting of total account, purchase, balance transfer, and promotional balance segments.

17. The method of claim 13, wherein the balance segments comprise fields selected from the group consisting of status, balance rule name, balance segment name, terms and conditions name, and expiration date fields.

18. The method of claim 13, wherein the balance rules comprise variables selected from the group consisting of start date, end date, Merchant Category Code (MCC), transaction amount, transaction type, merchant name, and merchant identification number variables.

19. A method for processing a financial transaction, comprising:

defining a plurality of balance segments, wherein the balance segments comprise a balance on a customer's account;

associating a plurality of balance rules with each balance segment, wherein the balance rules govern the allocation of the financial transaction to a particular balance segment;

associating a plurality of terms and conditions with each balance segment;

receiving incoming credit card transaction data from a credit card transaction network, wherein the transaction data includes an account number;

selecting one or more of the balance segments to be associated with the account number;

analyzing whether the transaction data complies with limitations of the balance rules of the applicable balance segment with a transaction level processor;

storing the transaction data in a masterfile under the applicable balance segment; and providing incentives corresponding to the applicable balance segment and the associated terms and conditions to a customer making the transaction.

20. The method of claim 19, further comprising: generating a report/bill that details all or a portion of the masterfile.

21. The method of claim 19, wherein the terms and conditions comprise a set of balance variables selected from the group consisting of pricing, fee structure, minimum payment, and discount balance variables.

22. The method of claim 19, wherein the balance segments comprise balance segments selected from the group consisting of total account, purchase, balance transfer, and promotional balance segments.

23. The method of claim 19, wherein the balance rules comprise variables selected from the group consisting of start date, end date, Merchant Category Code (MCC), transaction amount, transaction type, merchant name, and merchant identification number variables.

\* \* \* \* \*